Figure 1:
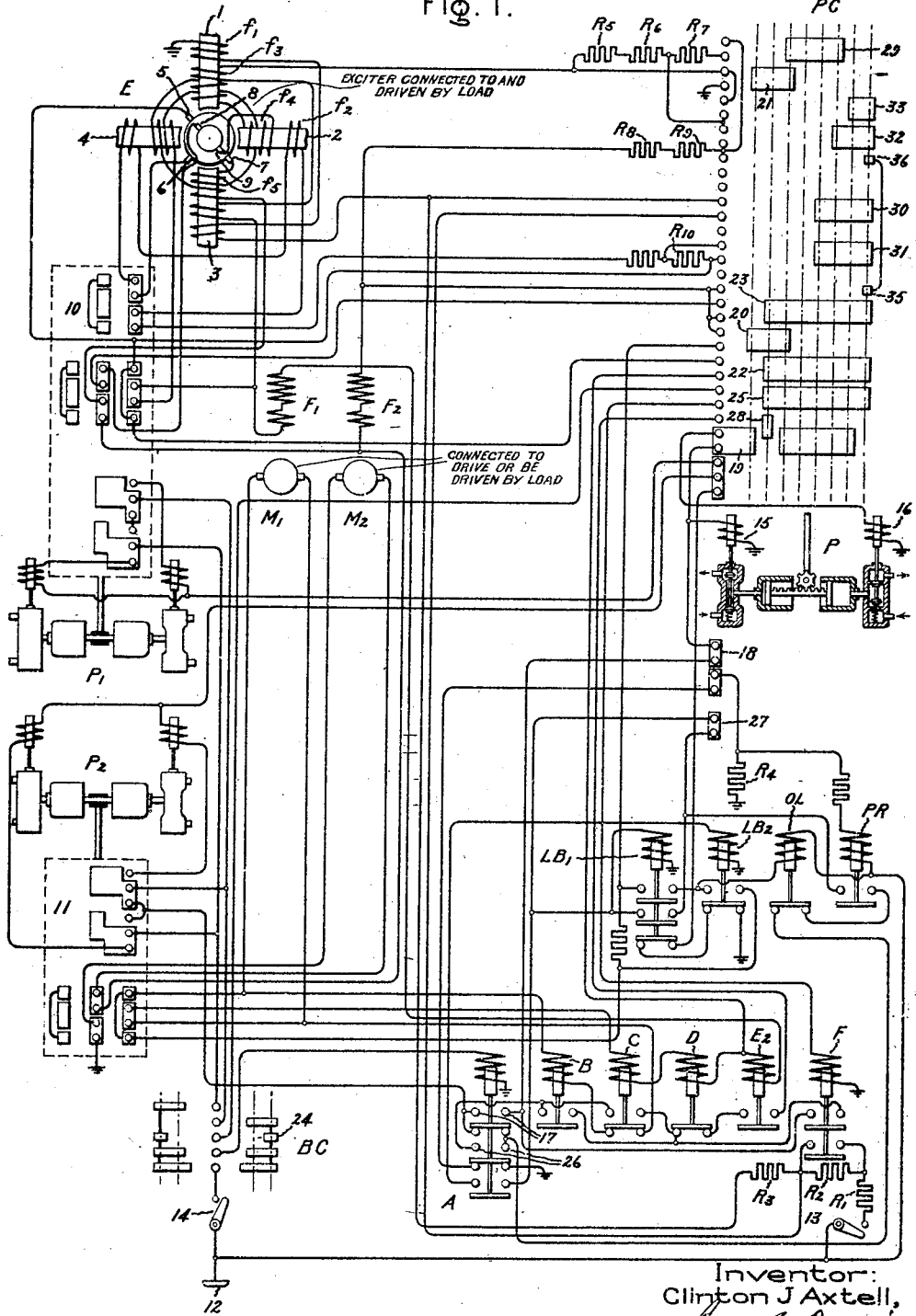

Inventor:
Clinton J Axtell,
by (signature)
His Attorney

UNITED STATES PATENT OFFICE.

CLINTON J. AXTELL, OF SCHENECTADY, NEW YORK, ASSIGNOR TO GENERAL ELECTRIC COMPANY, A CORPORATION OF NEW YORK.

ELECTRICAL SYSTEM OF POWER TRANSMISSION AND REGENERATIVE BRAKING.

1,378,511.   Specification of Letters Patent.   Patented May 17, 1921.

Application filed June 12, 1919. Serial No. 303,603.

*To all whom it may concern:*

Be it known that I, CLINTON J. AXTELL, a citizen of the United States, residing at Schenectady, county of Schenectady, State of New York, have invented certain new and useful Improvements in Electrical Systems of Power Transmission and Regenerative Braking, of which the following is a specification.

My invention relates to electrical systems of power transmission and regenerative braking, and particularly to systems of this kind comprising one or more dynamo-electric machines which are connected to a mechanical load and are adapted to alternatively operate as motors to drive said load or as generators to brake the load, and means for automatically regulating the current generated by said dynamo-electric machine and the braking effect during the generator operation thereof.

More particularly, my invention relates to a system of the kind referred to, wherein the excitation for the field windings of the dynamo-electric machines operating as generators to return energy to the line, is supplied by an auxiliary dynamo-electric machine, ordinarily called an exciter, connected to the mechanical load so as to be driven thereby.

A particular application of my invention is found in electric railway service wherein the driving motors are used to electrically retard the car or locomotive by regenerative braking, and one of the objects of my invention is to provide an improved arrangement for regenerative braking wherein the regenerated current shall be so controlled that the braking torque is maintained substantially constant or any predetermined braking torque may be obtained by means of an axle driven exciter which by means of its inherent characteristics automatically regulates the current in the motor fields during braking. Although not limited to such use, my invention is applied with particular advantage in electric railway service wherein frequent stops are made, such as in city service. In such service it is necessary that the braking interval shall be of as short duration as is practically possible, and the braking must begin and continue smoothly so as to avoid jolts. Electric railway cars for such service are ordinarily provided with series parallel arrangements for the motors, and my invention provides an improved arrangement whereby the braking may be begun with the motors in parallel and continue with a substantially constant braking torque despite variations in line voltage, variations in the speed of the car and variations in the grade, the motors being automatically connected to the line to begin regenerating when the motor voltage is of proper relation and value, the motors automatically changed from parallel to series at the proper moment, and finally the motors automatically disconnected from the line when the car has decreased in speed so that it is impracticable to attempt to continue the regenerative braking.

In carrying my invention into effect, I preferably use as an exciter for the motor fields, the dynamo-electric machine invented by Sven R. Bergman, for which application for patent was filed on August 3, 1916, Serial No. 112,940, patented May 11, 1920, No. 1,340,005, and the invention assigned to the same assignee as this invention. The fields, magnetic circuits and windings of the Bergman machine are so proportioned and arranged as to give a gradually increasing voltage as the speed of the machine decreases, thereby automatically increasing the excitation of the motor fields as the car decreases in speed and giving a substantially constant braking torque. With such an arrangement, no automatic regulating devices such as resistances and voltage regulators are required for regulating the regenerative current, since the inherent characteristics of the exciter are such that the excitation of the motor fields is automatically varied in the required manner. My invention is also applicable where it is desired to maintain a substantially constant regenerated current or produce any desired value of the regenerated current, as will be obvious to those skilled in the art from an understanding of my invention.

Figure 2:
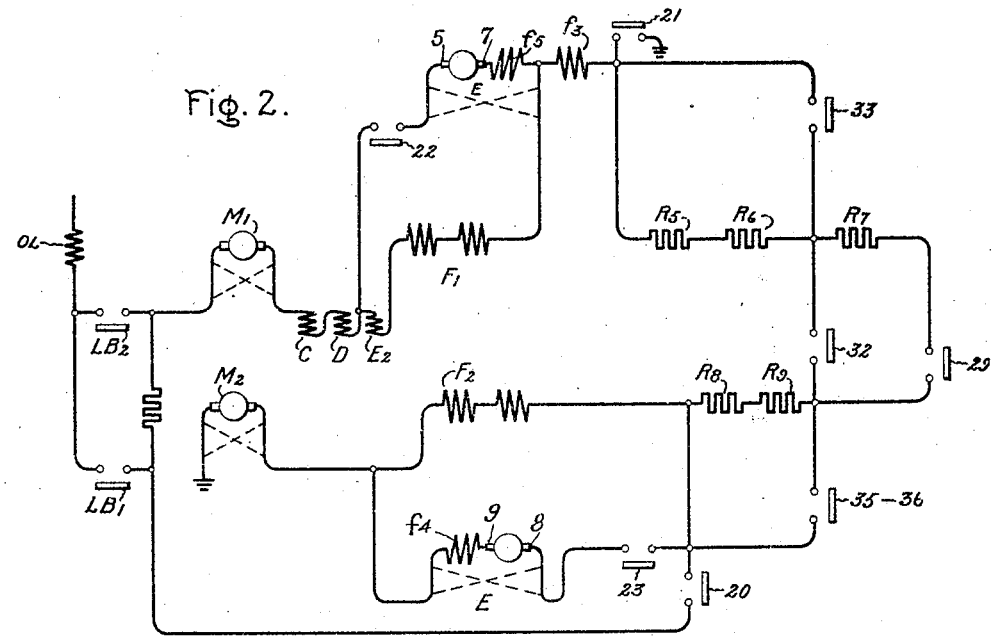
Figure 3:
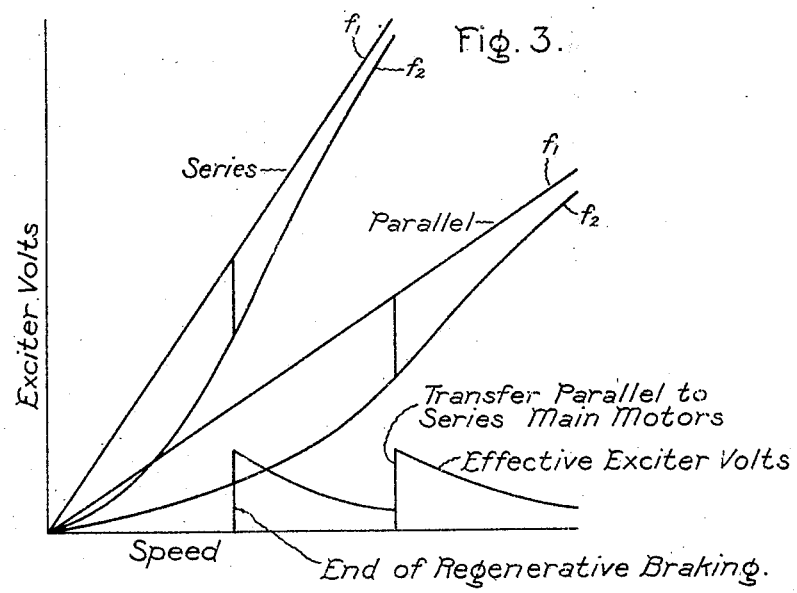

For a better understanding of my invention, reference is had to the accompanying drawings, wherein Figure 1 shows a system of regenerative braking control embodying my invention; Fig. 2 is a simplified diagram of the main motor circuits, and Fig. 3 shows the relation of the main and cross fields of the exciter and the effective exciter voltage during the parallel and series arrangements of the driving motors.

Referring to Figs. 1 and 2 of the drawings, in which the same numerals and letters refer to the same part, it will be observed that the control for the driving motors $M^1$ and $M^2$ for motoring operation has been omitted for the sake of clearness and an easy understanding of the invention, since any desired control for the motoring operation will readily be supplied by those skilled in the art, such forms of motor control being old and well understood. The driving motors $M^1$ and $M^2$ are provided with series fields $F^1$ and $F^2$ respectively, and the exciter E is provided for supplying the excitation for these series fields during the regenerative braking. The series parallel controller PC is provided for making the parallel and series arrangements of the motors $M^1$ and $M^2$ and also for varying the excitation of certain of the fields of the exciter as well as the resistances in the motor circuits during the transition from parallel to series relation. This controller PC is operated by means of an electropneumatic motor P, the electromagnet valves of which are controlled by means of the master braking controller BC having contacts and segments for two operative positions in both forward and reverse, the forward segments being to the right of the off position and the reverse segments being to the left of the off position.

The exciter E is provided with a plurality of field poles 1, 2, 3 and 4, the poles 1 and 3 being provided for supplying the main excitation and the poles 2 and 4 for supplying the cross excitation. On the main poles 1 and 3, the separately excited main field $f^1$ is provided, this field being connected across the line and energized responsively to the line voltage. The cross field $f^2$ wound on the poles 2 and 4 is connected across the load brush 5 and the auxiliary brush 6. By referring to Fig. 3, it will be seen that within the limits of operation, the voltage produced in the exciter armature due to the flux produced in the main poles 1 and 3 by the field winding $f^1$ will vary substantially directly as the speed of the exciter, and the voltage produced due to the cross field poles 2 and 4, on which are wound the cross field $f^2$, will vary as the square of the speed, so that a curve of this cross field voltage plotted with volts as ordinates and R. P. M. as abscissæ would be approximately a parabola sloping upward from the abscissæ line. The exciter E is preferably provided with two separate armature windings and two separate sets of brushes, the load brushes 5—7 receiving the current from the one armature winding for energizing the field $F^1$ of the driving motor $M^1$, and the load brushes 8—9 receiving energy from the other armature winding and adapted to supply the excitation for the field $F^2$ of the main motor $M^2$. The voltage across the load brushes 5—7 and 8—9 is the difference between the voltage due to the main field $f^1$ and the cross field $f^2$, and within the limits of operation, this differential voltage will increase as the speed of the exciter decreases, as will be seen from an inspection of Fig. 3. The voltage will not increase directly with the decrease in the speed of the exciter, but within the range in which the exciter is operated this voltage will vary in such a manner as to maintain a substantially constant braking torque. The field $f^3$ on the main poles 1 and 3 in series with the armature of motor $M^1$ and differentially wound with respect to the main field $f^1$, is provided for regulating the voltage of the exciter in accordance with the current in the regenerative circuit. The compensating winding $f^4$ in series with the brushes 8—9 is provided for compensating for the armature reaction in the armature winding with which the brushes 8—9 are associated. It will be remembered that this armature winding is provided for supplying the excitation for the field $F^2$ of motor $M^2$. The compensating winding $f^5$ in series with the brushes 5—7 is provided for compensating for the armature reaction in the armature winding with which the brushes 5—7 are associated. It will be remembered that this armature winding is provided for supplying the excitation for the field $F^1$ of motor $M^1$.

The reverser 10, provided with an upper set of contacts for reversing the connections of the cross field $f^2$, a middle set of connections for reversing the current through the compensating windings $f^4$ and $f^5$ and a lower set of contacts for insuring the correct operation of the reverser, is operated by means of an electropneumatic motor $P^1$, the electromagnet valves of which are controlled by means of the braking controller BC. The reverser 11 is provided with a lower set of contacts and segments for reversing the armatures of motors $M^1$ and $M^2$ and an upper set of contacts and segments for insuring the correct operation of the reverser. This reverser 11 is operated by means of an electropneumatic motor $P^2$, the electromagnet valves of which are controlled by means of the braking controller BC. The electromagnetic line switches LB¹ and LB² are provided for connecting the motors to the line, both these line breakers being closed when the motors are connected in parallel. These line brakers LB¹ and LB² are provided with electrical interlocks for preventing the reversal of the motor windings unless these switches are open. The overload relay OL and potential relay PR are provided for a purpose well understood in the art. The electromagnet switch A having a plurality of electrical interlocks is provided for transferring the control circuits from the motoring to the generating relation. The electromagnet relay B, the coil of which is adapted to be energized responsively to the voltage of the armature of motor M¹, is provided for preventing the motors being thrown on the line until the generated voltage has been built up to a slightly higher value than the line voltage, thereby automatically connecting the motors to the line at the proper moment so that there will not be either a rush of current from the motors to the line or from the line to the motors, thus eliminating all shocks in the beginning of the regenerative operation. The electromagnet relay C having its coil circuit in series with the armature of motor M¹ is provided for automatically disconnecting the motors from the line when the regenerated current drops to a predetermined low value as the car decreases in speed. This relay will automatically disconnect the motors from the line before the car is stopped, at such time that to continue the connection of the motors to the line would soon cause the motors to cease delivering energy to the line and begin receiving energy from the line so as to operate as motors. When this relay C drops open, the air brakes (not shown) will be applied by the operator to bring the car to a complete rest. The electromagnet relay D having its coil circuit also in series with the armature of motor M¹ is provided for automatically selecting the proper time at which the motor shall be changed from parallel to the series relation. Coöperating with this relay D is a relay E² having its coil circuit in series with the field F¹ of the motor M¹, the relay E² being designed so as to close its contacts when the current flowing in the field F¹ of motor M¹ has reached a certain value, and the relay D designed to drop out and close its contacts when the regenerated current is less than a predetermined value. By means of these relays the controller PC is automatically advanced to the series position when the speed of the car has decreased, so that a further increase in the excitation of the motor field does not serve to maintain the braking torque constant at the predetermined value. The electromagnet relay F is provided for cutting out the section R² of resistance in the main field $f^1$ of the exciter E. This resistance is included in the exciter field circuit $f^1$ to prevent the exciter causing the motors to build up an excessive voltage before being thrown on the line. When the braking controller is moved to the second operative position, this relay F is energized to close its contacts and short circuit this section of resistance, thereby increasing the voltage of the exciter gradually when the motors are connected to the line and in that manner prevent the shock due to a rush of current at the start of the regenerative operation.

In Fig. 3 the relation between the voltages of the main field $f^1$ of the exciter and the cross field $f^2$ are shown for the parallel and the series arrangements of the driving motors for various speeds of the exciter, and the effective exciter voltage which is the difference between these two voltages is also shown.

As thus constructed and arranged, the operation of my invention is briefly as follows: With the collector shoe 12 in engagement with the line conductor, the potential relay PR will pick up its contacts. Closing the pilot switch 13 energizes the main field $f^1$ of the exciter E across the line through a circuit including the resistance R¹, R² and R³, and the exciter will build up an effective voltage represented by the difference between the main field $f^1$ and the cross field $f^2$. By closing the pilot switch 14, the control circuits for the arrangement can be energized through the operation of the braking controller BC. Moving the braking controller to the left to its first operative position energizes the coil circuit of electromagnet relay A, causing this relay to pick up its contacts and transfer the control circuits from motoring to generator operation, and also open the direct path to ground for the potential relay PR so as to include the resistance R⁴ in the coil circuit of the potential relay. When the relay A picks up its contacts the electromagnet valves 15 and 16 of the electropneumatic motor P for the main controller PC are energized through a circuit including the upper segment of BC, the upper segment on the motor reverser 11, the upper set of contacts 17 of the relay A, the segment 18 on the motor controller to the coil circuit for valve 15. The coil for valve 16 is energized through a shunt circuit to the coil of valve 15 through the segment 19 on the main controller PC. The segment 18 is located at the off position of the controller for the motoring operation of the car or locomotive. The remainder of the motoring controller has been omitted for the sake of clearness since it is not necessary to an understanding of my invention. The valves of the electropneumatic motor P will thereby be moved to their lower positions, thus admitting air to the left hand cylinder and exhausting the air from the right hand cylinder, causing the main controller PC to be moved to the left to the first operative position, at which the segments 20 and 21 make engagement with their respective contacts.

The exciter armatures are not connected to the fields of the main motors until the main controller PC has moved to the second operative position through the operation of the electropneumatic motor P. At the second operative position the segments 22 and 23 make engagement with their respective contacts and the armature winding of the exciter with which the brushes 8—9 are associated is connected to the motor field $F^2$ and the armature winding with which the brushes 5—7 are associated is connected to the motor field $F^1$, the circuit for the one exciter armature and the field $F^1$ being closed through the segment 23, and the circuit including the other exciter armature for the motor field $F^2$ being closed at the segment 22. The circuit through the exciter brushes 8—9 is as follows: from brush 8 through a segment of the reversing switch 10, segment 23 of the PC controller, field winding $F^2$, segment on the reversing switch 10, field $F^4$ on the exciter to exciter brush 9. The connection for the other exciter armature windings is as follows: from brush 5 through contact segments of reversing switch 10, segment 22 of the PC controller through the coil of relay $E^2$, motor field $F^1$, segment of the reversing switch 10, field $f^5$ of the exciter to exciter brush 7. Each of the exciter armatures will now supply a current to its respective main motor field and the main motors will generate voltage. The line switches $LB^1$ and $LB^2$ to connect the motors to the source of supply in multiple will not close until the braking controller BC has been moved to its second operative position to the left and the relay F has closed its contacts. It will also be noted that when the main controller PC has moved to its second operative position, the magnet of valve 16 is deënergized, thereby admitting fluid under pressure to the right hand cylinder of the electropneumatic motor P, and since the electromagnet valve 15 remains energized, fluid under pressure is thus admitted to both cylinders and the controller is arrested from further movement. The electromagnet valve 16 cannot be energized so as to permit further movement of the main controller PC by the left hand piston until the braking has proceeded and the car has decreased to such a speed that the motors are to be automatically connected to the series relation. This will be described fully later on. When the braking controller is moved to the second operative position, the relay F is energized to close its contacts through a circuit including the segment 24 of the braking controller and the segment 25 of the main controller PC. The closing of the relay F short circuits the resistance $R^2$ in the main field $f^1$ of the exciter E, thereby permitting the exciter to gradually increase the excitation for the main fields $F^1$ and $F^2$. The inductance of the main field of the exciter as well as the inductance of the fields of the main motors causes the generated voltage to build up gradually so that when the motors are connected to the line the regenerative action begins gradually. When the voltage generated by the armature of the main motor $M^1$ has increased to such a value, that is slightly higher than the line voltage, the relay B closes its contacts and the coil circuits for the line switches $LB^1$ and $LB^2$ are automatically closed through a circuit including the contacts 17 of the relay A, upper contacts of relay F, contacts of relay B, contacts 26 of relay A, contacts of the overload and potential relays to the segment 27 on the motoring controller to the coil of $LB^1$, the coil of $LB^2$ being energized through a shunt circuit to the coil $LB^1$ through a circuit including the lower contacts of relay A. The line switches $LB^1$ and $LB^2$ will thereupon close, connecting the motors to the line in multiple at the proper interval, so that there will not be either a rush of current from the motors to the line or from the line to the motors. Because of the fact that the relay F has short circuited the resistance $R^2$ in the main field $f^1$ of the exciter E, the effective voltage of the exciter will increase gradually so that the full regenerated current will not flow at the moment of the closing of the line breakers. The regenerated current will build up gradually in a comparatively short interval, but one of sufficient duration to prevent a heavy rush of current and thus cause a jolt to the car.

The connection of the motor armature circuits for parallel regenerative operation is as follows: starting with the ground connection through the segment 21 on the PC controller, field $f^3$ of the exciter, segment of reversing switch 10, field $f^5$ of the exciter to exciter brush 7, through one of the exciter armature windings to the brush 5, segments of the reversing switch 10, segment 22 on the PC controller through the coils of relays D and C in series, segment on the reversing switch 11, armature of $M^1$, segments of the reversing switch 11, contacts of line breaker $LB^2$ through the coil of overloaded relay OL to the collector shoe or trolley 12. The connections for the motor $M^2$ are as follows: from the connection to ground through segment of reversing switch 11, armature $M^2$, segment of reversing switch 11, segment of reversing switch 10, field $f^4$ of the exciter to exciter brush 9, armature of the exciter to exciter brush 8, segment of reversing switch 10, segment 23 of the PC controller, segment 20 of the PC controller, through contacts of line breaker LB¹, coil of over-loaded relay OL to the collector shoe or trolley 12. The connection for series regenerative operation is as follows: from the connection to ground through segment of reversing switch 11, armature M², segment of the reversing switch 11, segment of reversing switch 10, field $f^4$ of the exciter to exciter brush 9, armature of exciter to exciter brush 8, segment of reversing switch 10, segment 23 of the PC controller, segments 35 and 36 of the PC controller, segments 32 and 33 of the PC controller, exciter field $f^3$, segment of the reversing switch 10, exciter field $f^5$ to exciter brush 7, through the other armature of the exciter to exciter brush 5, segments of reversing switch 10, segment 22 of the PC controller through relay winding D and C in series, segment of reversing switch 11 through armature M¹, segments of reversing switch 11, contacts of line breaker LB², winding of overload relay OL to the collector shoe or trolley 12.

Because of the fact that the exciter E is designed so as to be inherently self-regulating to give an increased voltage as the speed of the car decreases, the regenerated current will be of such value as to automatically maintain the braking torque substantially constant, and motor operated rheostats, voltage regulators of the Tirrill type and the like need not be provided. Because of the fact that the main field $f^1$ of the exciter is connected across the line, the exciter will automatically take care of fluctuations in line voltage. If the line voltage should suddenly increase, the excitation supplied by the fields $f^1$ and $f^2$ will likewise increase, but the difference between the main and cross excitation, which is the effective voltage of the machine, will be automatically increased so as to increase the excitation of the main motor fields and increase the generated voltage to correspond with the increase in the line voltage. In a similar manner a decrease in line voltage will decrease the effective voltage of the exciter, the excitation of the main motor fields and the generated voltage. Variations in speed of the car are also automatically compensated for by means of the cross excitation supplied by the field $f^2$. Thus an increase in speed of the car, assuming that the line voltage remains constant, will decrease the effective voltage of the exciter and thereby decrease the excitation of the main motor fields and properly compensate for the increased voltage of the main motors due to the increase in speed of the car. A decrease in the car speed, assuming the line voltage to remain constant, will increase the effective voltage of the exciter to properly compensate for the decreased speed of the main motors. The differential series field $f^3$ which is provided on the main poles 1 and 3 of the exciter E, and energized responsively to the regenerated current, provides a further means for automatically maintaining a constant braking torque by varying the excitation of the main poles 1 and 3 inversely with the regenerated current. As will be obvious, by suitably varying the resistances in the exciter main and cross fields, any desired regenerated current, within practical limits, may be obtained.

It will also be noticed that since the exciter E is driven by the car it also supplies a retarding effect to supplement the retarding effect of the main motors, and the time required to stop the car is reduced to the minimum.

While I have described my invention as operating to maintain a substantially constant braking torque, it will be obvious to those skilled in the art that by suitably varying the excitation of the exciter fields $f^1$ and $f^2$ the regenerated current may be varied in any desired manner or be maintained substantially constant.

When the motors begin regenerating and the regenerated current has increased to substantially the predetermined constant value, the relay C having its coil circuit in the armature circuit of motor M¹ will pick up, closing its upper set of contacts, and temporarily take the coil circuit for the line breakers LB¹ and LB² from control by the voltage relay B. When the relay C picks up, it opens the coil circuit for the relay B at its lower set of contacts. The line breakers are thereby maintained closed responsively to the regenerated current. As long as the regenerated current is substantially constant the series relay D will also hold open its contacts. When the speed of the car has decreased to such a value that an increased excitation of the main motor fields does not maintain the regenerated current at substantially the predetermined constant value, the relay E² having its coil circuit in series with the field F¹ of the main motor M¹ will pick up and close its contacts, the relay D will close its contacts and the coil of the electromagnet valve 16 will be energized to connect the right hand cylinder of electro-pneumatic motor P to atmosphere, thereby permitting the left hand cylinder to advance the controller through certain transition steps to the full series position for the main motors. The coil circuit for the magnet valve 16 is completed through a circuit including the contacts 17 of relay A, upper contacts of relay F, contacts of relay D, contacts of relay E², and segment 28 on the main controller PC.

When the main controller PC is advanced to the third operative position by the electropneumatic motor P, the coil circuit for the electromagnet valve 16 is completed through a segment on the main controller which is in alinement with the segment 19 and the valve 16 will be maintained in its lower position independently of the relays D and E². At the third operative position the segment 29 on the main controller makes engagement with its corresponding contacts and includes resistance R⁵ to R⁹ inclusive across the line in a shunt circuit around the motors M¹ and M². At the fourth operative position the one ground connection for the motors is opened at the segment 21 and one of the connections of the motors to the line is opened at the segment 20, thereby connecting the motors in series relation across the line with the resistances R⁵ and R⁹ inclusive in series in the motor armature circuit. At the fifth operative position the resistance R¹⁰ in the cross field $f^2$ of the exciter is shunted at segment 31 and the resistance R³ in the main field circuit $f^1$ of the exciter is simultaneously shunted at the segment 30. The exciter voltage is thus automatically reduced, and though the excitation of both the fields $f^1$ and $f^2$ have been increased, the difference between these voltages which is the effective voltage of the exciter has been decreased, as will be seen from an inspection of Fig. 3. At the sixth operative position the resistance R⁷ in series with the motor armature is shunted at the segment 32. At the seventh operative position the resistances R⁵, R⁶ and R⁷ are shunted at the segments 32 and 33. At the eighth operative position the resistances R⁸ and R⁹ are also shunted at segments 35 and 36, and the motors are connected in series across the line with all the resistances cut out of the motor armature circuit. The operation of the exciter E in maintaining substantially constant braking torque, despite variations in speed of the car, fluctuation in line voltage, etc., is the same as that described in connection with the motors operating in multiple. When the speed of the car has decreased to such a value that a further increase of motor field excitation does not maintain the braking torque constant, the relay C drops out and the line breakers LB¹ and LB² are caused to drop out and the magnet coil 15 deënergized so that the controller PC will automatically return to the off position.

In order to cause the motors to regenerate when the car is coasting in the reverse direction from that heretofore explained, the braking controller will be thrown to the right from its off position, thereby energizing the magnet valves of the electropneumatic motors P¹ and P² to cause these motors to reverse the motor armature connections at the reverser 11, and the cross field $f^2$ and the armature and compensating fields $f^4$ and $f^5$ of the exciter E at the reverser 10. The operation of my arrangement for the reverse direction is otherwise the same as that described in connection with the forward direction when the braking controller was thrown to the left from its off position.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim as new and desire to secure by Letters Patent of the United States, is:—

1. The combination in a regenerative control system of a source of supply, a dynamo electric machine comprising an armature and a series field winding, the said machine having its armature and series field winding connected in series to the source of supply and adapted to operate as a motor to drive a load or as a generator to brake a load by delivering energy to the source of supply, an exciter connected to the load and driven thereby supplying the excitation for the series field of said machine during generator operation, the said exciter having inherent means comprising a main field winding energized responsively to the voltage of the source and a differential winding energized responsively to the regenerated current for automatically regulating the regenerated current to produce a predetermined braking effect on said load.

2. The combination in a regenerative control system of a source of supply, a dynamo electric machine comprising an armature and a series field winding, the said machine adapted to operate as a motor to drive a load or as a generator to brake a load by delivering energy to the source of supply, an exciter connected to the load and driven thereby supplying the excitation for the series field of said machine during braking, said exciter having inherent characteristics such that said machine operating as a generator will produce a predetermined braking torque despite variations in the speed of the load, variations in the potential of the source of supply, and momentary fluctuations of the regenerated current from the value to maintain the predetermined braking torque.

3. The combination in a regenerative control system of a source of supply, a dynamo electric machine comprising an armature and a series field winding, the said machine adapted to operate as a motor to drive a load or as a generator to brake a load by delivering energy to the source of supply, an exciter connected to the load and driven thereby supplying excitation for the series field of said machine during generator operation, the said exciter having a main field winding energized responsively to the voltage of the source and a plurality of field windings differentially wound with respect thereto, one of said differential windings energized from the exciter responsively to the speed of the exciter and another of said differential windings energized responsively to the regenerated current, whereby the dynamo electric machine will maintain a predetermined braking torque.

4. The combination in a regenerative control system of a source of supply, a dynamo electric machine comprising an armature and a series field winding, the said machine adapted to operate as a motor to drive a load or as a generator to brake a load by delivering energy to the source of supply, an exciter connected to the load and driven thereby supplying the excitation for the series field of said machine during braking, the said exciter having a main field winding energized responsively to the line voltage and a differential cross field energized from the exciter responsively to the speed of the exciter, whereby the voltage of the exciter increases as the speed of the load decreases.

5. The combination in a regenerative control system of a source of supply, a dynamo electric machine comprising an armature and a series field winding, the said machine adapted to operate as a motor to drive a load or as a generator to brake a load by delivering energy to the source of supply, an exciter connected to the load and driven thereby supplying the excitation for the series field of said machine during braking, the said exciter having a main field winding energized responsively to the line voltage and a differential cross field supplied with current from the exciter armature whereby the regenerated current is of such a value as to maintain a predetermined braking torque, a resistance in the main field of the exciter and means for short circuiting this resistance so that the exciter voltage will gradually increase and the regenerated current delivered to the source of supply will gradually increase at the beginning of the regenerative operation.

6. The combination in a regenerative control system of a source of supply, a dynamo electric machine comprising an armature and a series field winding, the said machine adapted to operate as a motor to drive a load or as a generator to brake a load by delivering energy to the source of supply, an exciter connected to the load and driven thereby supplying the excitation for the series field of said machine during braking, the said exciter having a main field winding energized responsively to the line voltage and a differential cross field supplied with current from the exciter armature whereby the regenerated current is of such a value as to maintain a predetermined braking torque, means responsive to the generated voltage of said dynamo-electric machine for connecting the machine to the source of supply when the voltage of the machine is slightly higher than the voltage of the source, a resistance in the main field of the exciter, and means for short circuiting said resistance whereby the exciter voltage gradually increases, the machine is connected to the source of supply, and the regenerated current delivered to the source gradually increases at the beginning of the regenerative operation.

7. The combination in a regenerative control system of a source of supply, a plurality of dynamo electric machines each having an armature and a series field winding, the said machines connected in parallel to the source and adapted to operate as generators to deliver energy to the source, an exciter connected to the load and driven thereby supplying the excitation for the series fields of said machines during generator operation, the said exciter having inherent characteristics such that the exciter voltage increases as the speed of the load decreases, and means for automatically decreasing the effective voltage of said exciter and effecting a transition of said dynamo electric machines from parallel to series relation in response to the current in the series field of one of said dynamo electric machines.

8. The combination in a regenerative control system of a source of supply, a plurality of dynamo electric machines each having an armature and a series field winding, the said machines connected in parallel to the source and adapted to operate as generators to deliver energy to the source, an exciter connected to the load and driven thereby supplying the excitation for the series fields of said dynamo electric machines during generator operation, the said exciter having inherent characteristics such that the exciter voltage increases as the speed of the load decreases, and means energized responsively to the armature and field currents of one of said dynamo electric machines for automatically decreasing the effective voltage of said exciter and changing the said dynamo electric machines from parallel to series relation.

9. The combination in a regenerative control system of a source of supply, a dynamo electric machine comprising an armature and a series field winding, the said machine adapted to operate as a motor to drive a load or as a generator to brake a load by delivering energy to the source of supply, an exciter supplying the excitation of the series field of said machine during braking, the said exciter having an armature and a field winding and inherent characteristics such that its voltage increases as the speed of the load decreases, means for decreasing the resistance of the exciter field circuit, and means for automatically connecting the said machine to the source of supply as the voltage of said exciter and said machine is increasing, whereby the regenerated current increases gradually at the beginning of the regenerating operation.

In witness whereof, I have hereunto set my hand this 11th day of June, 1919.

CLINTON J. AXTELL.